Sept. 26, 1944. A. W. PLENSLER Re. 22,549
ELECTRIC MOTOR
Original Filed July 2, 1940 3 Sheets-Sheet 1
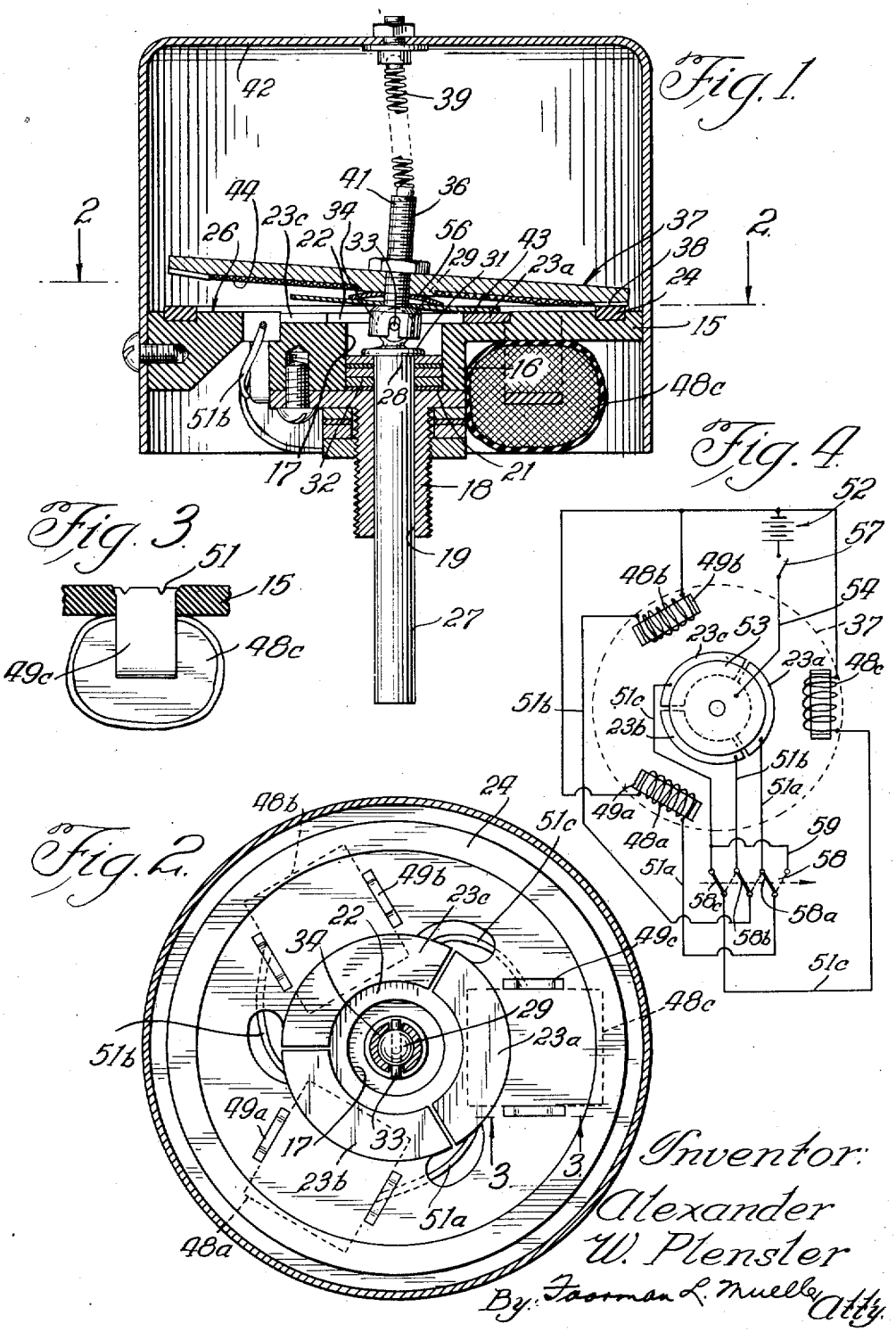

ELECTRIC MOTOR

Original Filed July 2, 1940 3 Sheets-Sheet 2

Inventor:
Alexander W. Plensler
By Foorman L. Mueller
Att'y.

Sept. 26, 1944. A. W. PLENSLER Re. 22,549

ELECTRIC MOTOR

Original Filed July 2, 1940 3 Sheets-Sheet 3

Inventor:
Alexander W. Plensler
By: Foorman L. Mueller
Att'y.

Reissued Sept. 26, 1944 Re. 22,549

UNITED STATES PATENT OFFICE 22,549

ELECTRIC MOTOR

Alexander W. Plensler, Chicago, Ill., assignor to Belmont Radio Corporation, Chicago, Ill., a corporation of Illinois Original No. 2,275,827, dated March 10, 1942, Serial No. 343,640, July 2, 1940. Application for reissue March 8, 1943, Serial No. 478,390

22 Claims. (Cl. 172—36)

This invention relates to electric motors and in particular to a slow speed, high torque motor of electromagnetic type.

The prior art motors of small type generally operate at relatively high speeds and are primarily adapted for low torque operation at such speeds so that only in very few instances can they be connected directly to the apparatus to be driven. The application of these motors to high torque operating conditions, therefore, requires the use of suitable gear reduction means arranged between the motor and the load or apparatus to be driven. It is readily apparent that the greater the reduction in speed the bulkier will be the gear reduction mechanism. This combination of a high speed motor with gear reduction mechanism for slow speed and high torque operation makes for an inefficient, expensive, and cumbersome operating unit as well as for a unit having undesirable inertia effects during both the starting and stopping thereof, due to the weight of the usual motor armature and the reduction mechanism.

Another objection of the prior art motors, particularly when they are used in the operation of apparatus which is adapted for both manual and automatic control, is the need for suitable means to de-clutch the motor from the apparatus when the apparatus is conditioned for manual control. Although the provision of such clutch means in the power transmitting system of the motor facilitates the manual operation of the control apparatus by eliminating any manual turning of the motor and the gear reduction mechanism, it also further increases the cost and bulk of the motor operating unit.

It is an object of this invention, therefore, to provide an improved motor of electro-magnetic type.

Another object of this invention is to provide an electric motor which is readily adapted for operation in both directions of rotation by a relative arrangement of its structural parts.

Yet another object of this invention is to provide an electric motor which is of simple and rugged construction, comprised of but relatively few parts, and inexpensive in cost.

An object of this invention is to provide an electric motor having speed reduction mechanism formed as an integral part of the motor structure.

A still further object of this invention is to provide an electric motor which is capable of developing a high torque at slow speed. The motor may thus be directly connected to the apparatus to be driven without the use of separate gear reduction means.

A feature of this invention is found in the provision of an electro-magnetic motor having an armature, the shaft of which is connected to the motor shaft through a pin and ball socket connection to provide for a rocking or wobble movement of the armature without effecting any rotational movement of the shaft. The armature is rotated by engagement of an annular portion thereof with a fixed contact ring which is in concentric arrangement with the motor shaft; the relative lengths of the engageable portions of the armature and the contact ring determining the direction and speed of rotation of the armature. This rotation of the armature in turn rotates the motor shaft through the pin connection.

A particular feature of this invention is the provision of a slow speed high torque electric motor in which the armature is freely and directly rotatable with the motor shaft immediately on shutting down of the motor so that the motor is completely and automatically conditioned for easy manual turning or "free wheeling" operation.

A further feature of this invention is found in the provision of an electro-magnetic motor in which an armature of disc type is mounted on the motor shaft in a manner to provide for a wobble movement thereof without effecting any rotation of the shaft. A control switch of disc form movable with the armature and adapted to selectively energize the magnet units is urged at all times into an inclined position relative to the motor shaft so that a portion of its circumferential rim is always in engagement with one of a plurality of commutator segments arranged in concentricity with the motor shaft. A constant frictional engagement is thus maintained between the control switch and the commutator segments so that the travel of the armature on closing of the motor circuit is substantially immediately stopped by this braking action whereby to eliminate any overrunning of the motor on stopping thereof.

Further objects, features and advantages of this invention will appear from the following description when taken in connection with the accompanying drawings in which:

Fig. 1 is a sectional view of one form of the invention;

Fig. 2 is a sectional view taken approximately along the line 2—2 in Fig. 1;

Fig. 3 is a detail view of an electro-magnetic unit as seen along the line 3—3 of Fig. 2;

Fig. 4 is an electrical control circuit which may be used with the invention;

Figure 5:
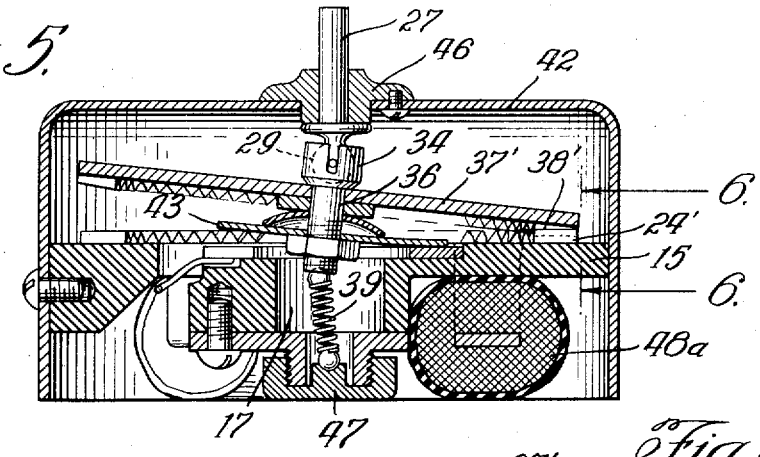
Fig. 5 is a modified arrangement of the embodiment shown in Fig. 1.

In the practice of this invention an armature of disc or plate type is operatively connected to one end of the motor shaft by a pin and ball socket connection, to provide for a wobble or pivotal movement but not a rotational movement independently of the shaft. The extent of the armature wobble movement is normally limited by the engagement of the tipped circumferential armature portion with a fixed contact ring or track which is arranged in concentricity with the motor shaft. When the engageable portions of the armature and contact ring are of the same length the travel of the armature on the contact ring during the wobble action of the armature does not impart any rotational movement to the motor shaft. A substantially continuous wobble movement of the armature is obtained by the arrangement of magnet coils in substantial concentricity with the contact ring, the coils being electrically controlled to successively attract the armature in advance of the tipped portion thereof so as to move the armature in one direction. By varying the relative lengths of the engageable portions of the armature and contact ring an angular displacement occurs between the armature and the contact ring during the rocking or wobble movement of the armature, which displacement is transmitted to the motor shaft through the pin and ball connection. By virtue of this arrangement a small angular displacement of the motor shaft may be obtained as the result of a complete wobble cycle or rocking movement of the armature through 360°, so that a plurality of such cycles are required to rotate the shaft through a single complete revolution. In one embodiment of the invention a motor rated at about 3 watts is capable of operation at a speed on the order of two revolutions per minute, whereby a relatively high torque is produced at a very slow speed. With the speed of rotation of the motor shaft dependent upon the frequency and degree of angular displacement which takes place between the armature and contact ring, a variety of motor speeds and corresponding torque variations are readily obtained by a relative changing only in the lengths of the engageable portions of the armature and ring. A gear reduction mechanism for the motor thus constitutes a part of the motor structure per se. On de-energization of the magnet coils the armature is immediately released from its engagement with the contact ring so as to be freely rotatable with the motor shaft. A motor of this type is not commercially known nor is one shown by the prior art and it is believed to be entirely novel.

Referring to Fig. 1 the motor is shown as including a base or fixed frame portion 15 of substantially flat shape having a boss portion 16 depending substantially centrally therefrom, a bore 17 being formed in the portion 16. Suitably secured at the lower end of the bore 17, as viewed in Fig. 1, is an externally threaded bushing 18 having a bore 19 therein of smaller diameter than the bore 17, but arranged in axial alignment therewith, the adjacent ends of the bores 17 and 19 being defined by a shoulder portion 21. An annular recess 22 is formed about the upper end of the bore 17, for receiving therein commutator segments 23*a*—23*c* (Fig. 2) three only of which are illustrated, although it is to be understood that any number can be used depending upon the operating conditions to which the motor is to be applied. In concentric arrangement with the segments 23*a*—23*c* and bore 17 is a contact or armature ring 24 which extends about the segments and is fixedly positioned in the frame member 15 in a manner to provide a circular track on the flat upper side 26 thereof. The base member 15 is illustrated as being of an insulating material to facilitate the assembly of the motor, but it is readily understood that a suitable metal base may be provided with the motor parts being suitably insulated therefrom.

The motor shaft 27 is rotatably supported in the bushing 18 and is formed at its upper or motor end 28 with a ball portion 29 and an annularly extending flange portion 31; the portion 31 being adapted for rotatable support on spacers 32 which are located within the bore 17 and supported on the shoulder portion 21. The ball 29 of the motor shaft is provided with a diametrically extending pin 33, the pin and ball being adapted for connection with a slotted socket 34 provided at one end of an armature shaft 36. Mounted about the shaft 36 is an armature 37 of substantially disc shape which is of a size to provide for the engagement of its circumferential rim portion 38 with the track means 24. The spacers 32 serve to separate the contact ring and armature 37 a distance apart sufficient to provide for a pivotal swinging or rocking of the armature relative to the ring, so that a portion only of the circumferential rim 38 will be in engagement with the contact ring at any one time during the normal operation of the motor. A spring 39, which is arranged in compression between the end 41 of the armature shaft 36 and the top of the motor housing 42, provides for a positive contact at all times between a spring disc 43 movable with the armature 37 and one of the segments 23*a*—23*c*, as will be explained.

The pin and ball joint between the shafts 36 and 27 permits a rocking but not a rotatable movement of the armature independently of the motor shaft 27. When the lengths of the armature portion 38 and track 24 are equal, this rocking or wobble movement of the armature does not effect any angular displacement of the armature relative to the track 24, so that the shaft 27 remains stationary. However, when the lengths of the engagement portions of the armature and track are no longer equal to each other an angular displacement will occur between the armature and the contact ring. Thus on the completion of a wobble cycle or progressive tipping of the armature through 360°, the ring and armature portions in engagement at the start of the cycle will be angularly displaced from each other at the end of the cycle a distance depending upon the difference in the lengths of the engaged annular portions of the armature and contact ring. The amount of this angular displacement is transmitted directly to the motor shaft 27 through the pin and slot in the ball joint to rotate the shaft, the speed of the motor shaft being dependent upon the frequency of the wobble cycle and the angular displacement of the armature during each cycle. It is seen, therefore, that when the lengths of the engageable portions of the contact ring and armature are equal to each other no angular displacement or rotation of the armature will be obtained during its wobble or rocking action, and hence the wobble action will proceed without effecting any rotation of the shaft 27.

In the efficient operation of the motor it is to be understood that the frictional engagement between the armature portion 38 and the contact ring 24 is sufficient to eliminate any slippage therebetween, so that a positive creeping action between such parts will be obtained when they are arranged to effect a rotation of the armature. In Fig. 1 the ring 24 is illustrated as being composed of rubber or like material, with the armature portion 38 being of metal or fiber and formed with a plurality of successive teeth or serrations 44. As further illustrated the diameter of the armature 37 is less than the diameter of the contact ring 24, so that the length of the annular portion 38 is less than the circumferential length of the ring 24. Engagement, however, is provided between the portion 38 and ring 24 by the location of the ball and socket connection 29—34 below the armature, as viewed in Fig. 1. This location of the connection below the armature 37 provides for a pivotal movement of the armature toward the right, as also viewed in Fig. 1, which movement inclines the axis of the armature toward the contact ring at the ring portion engaged by the armature. The location of the armature fulcrum below the armature thus acts to extend the tipped portion of the armature toward the ring 24 to engage the portion 38 with the contact ring 24, even though the armature is of less diameter than the ring. Since the annular length of the armature portion 38 is less than the circumferential length of the ring 24 a wobble movement progressing in a clockwise direction, as viewed in Fig. 2, will rotate the armature 37 and hence the shaft 27 in a counter-clockwise direction. This is accomplished by virtue of the fact that when the entire armature portion 38 has progressively contacted the ring 24, the armature is angularly disposed in a counter-clockwise direction from its initial contact position with the ring; the amount of the displacement being proportional to the difference in the circumferential lengths of the portion 38 and the ring 24. An opposite direction of rotation of the shaft 27 is obtained by the arrangement shown in Fig. 5, in which parts similar to those described in connection with Fig. 1 are designated by similar numerals of reference.

The motor shaft 27 is rotatably supported in a journal or bearing portion 46 which is mounted in the motor housing 42. The shaft 27 and armature shaft 36 are connected together by the ball and socket joint 29—34 which is located at the lower end of the motor shaft 27 and above the armature 37'. It is thus seen that the fulcrum of the armature is oppositely disposed from the position shown in Fig. 1. The spring 39 is located in the bore 17 formed in the fixed member 15 and is arranged in compression between the armature shaft 36 and a cap or plug member 47 fitted over the lower end of the bore 17. With the armature 37' in a horizontal position the motor shaft 27, armature shaft 36 and spring 39 are all in axial alignment. However, by virtue of the toggle action of the spring 39 the armature is slightly tilted at all times to provide for the positive engagement of the disc 43 with one of the segments 23a—23c, for a purpose to be explained.

As illustrated in Fig. 5, the diameter of the armature 37' is greater than the diameter of the contact ring or track 24'. Engagement between the armature portion 38' and track 24 is obtained, however, by location of the fulcrum or ball connection 29—34 above the armature 37'. This location of the connection serves to incline the axis of the armature shaft 36 away from the portion of the ring 24' engaged by the armature portion 38' so that the effective length of the diameter of the armature is decreased at such engaged portion by an amount proportional to the angle formed between the axes of the motor and armature shafts. With the wobble movement of the armature 37', as viewed in Fig. 2, progressing in a clockwise direction an angular displacement of the armature 37' and hence rotation of the motor shaft 27 will occur in a clockwise direction. This is accomplished by the fact that the circumferential length of the portion 38' is greater than the circumferential length of the contact ring 24', so that upon completion of a wobble cycle or progressive tipping of the armature 37' through 360° the initially engaged point of the portion 38' will have moved in a clockwise direction beyond the initially engaged point of the ring 24'. The displacement between such initially engaged points during an entire wobble cycle is equal to the difference between the circumferential lengths of the portion 38' and the ring 24'. The positioning of the armature fulcrum on either side of the armature thus provides for a reversal in the direction of rotation of the motor shaft without changing the direction of the wobble movement of the armature.

Figure 6:
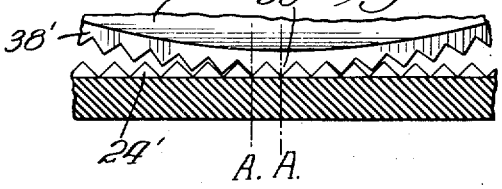
Fig. 6 is an enlarged fragmentary view partly in section taken along the line 6—6 in Fig. 5.

In the description thus far of Figs. 1 and 5 the portion 38 and ring 24 and portion 38' and ring 24', respectively, have been understood as being frictionally engageable. As indicated in Figs. 5 and 6 with respect to the armature 37' and ring 24', engagement between these parts may be positively established by their geared assembly. The contact ring 24' may be provided in a metal or suitable composition material. When the number of teeth in the portion 38' is equal to that in the ring 24' the progressive tipping of the armature 37' will effect a wobble movement only of the armature without providing for any relative angular displacement between the armature and the contact ring. However, upon the provision of an unequal number of teeth in the portion 38' and ring 24' the armature 37' during a complete wobble cycle thereof, will be rotated an amount equal to the difference in the number of teeth on the portion 38' and ring 24'. For example, let it be assumed that the portion 38' is formed with 150 teeth and that the ring portion 24' is formed with 149 teeth, with the armature 37' and ring 24' arranged as shown in Fig. 5 and the wobble movement of the armature proceeding in a clockwise direction as viewed in Fig. 2. Upon completion of a wobble cycle of the armature 37' the tooth 50 on the armature as indicated in Fig. 6, will have moved in a clockwise direction, an amount shown between the lines A—A or the distance of one tooth. 150 complete wobble cycles of the armature 37' are thus required to rotate the armature and hence the shaft 27 one complete revolution in a clockwise direction. Similarly, if the difference in the number of teeth on the portion 38' and contact ring 24' is two teeth, the armature 37' will be advanced in a clockwise direction a distance equal to two teeth on the completion of each wobble cycle so that but 75 wobble cycles would be necessary to effect a complete revolution of the shaft 27 in a clockwise direction.

To obtain a reversed rotation of the motor shaft with the wobble movement in the same direction, the ring 24' is formed with a greater number of teeth than the armature portion 38', and the armature and ring are arranged similarly to the corresponding parts in Fig. 1. Thus assuming the armature 37' to have 149 teeth and ring 150 teeth, the completion of a wobble cycle will move the armature in a counter-clockwise direction, as viewed in Fig. 2, a distance equal to one tooth, so that a complete revolution of the shaft 27 in a counter-clockwise direction will be obtained after 149 wobble cycles. Similarly, if the number of teeth on the portion 38' is two less than the number of teeth on the ring 24', the completion of a wobble cycle will move the armature in a counter-clockwise direction a distance equal to two teeth, so that a complete revolution of the shaft 27 in a counter-clockwise direction will be obtained after but 74½ wobble cycles.

It is seen, therefore, that once the direction of motor shaft rotation has been established the speed of rotation can be varied by changing the gear ratio between the armature and its engaging track. Since the occurrence of a relative angular movement between the armature and the ring, during any wobble movement of the armature, is necessary to rotate the motor shaft a gear reduction means is thus provided which forms a part of the motor structure per se. When the armature and track are frictionally engaged the reduction is determined from the relative lengths of the engageable annular portions of the armature and track. The geared assembly provides for a more accurate control of the gear ratio and hence a more accurate control of the motor speed, so that fractional speeds such as 1½ or 2¼ revolutions per minute are easily obtained. Regardless of the motor speed the electrical power supplied to the motor remains the same as will be explained, so that a high torque is available at all operating speeds. Also since the mechanical friction in the motor is substantially the same irrespective of the gear reduction used, the motor efficiency remains high at all operating speeds.

A continuous rocking or wobble movement of the armature 37 is obtained by positioning the armature in the effective magnetic zone of a plurality of magnets which are arranged so that a successive operation thereof will progressively tip the armature in a single direction, as will now be explained. Magnet coils 48*a*, 48*b*, and 48*c* corresponding to the commutator segments 23*a*, 23*b*, and 23*c*, respectively, are mounted on the lower side of the base member 15 as viewed in Figs. 1 and 5, each coil being provided with a pair of poles 48*a*—49*c*, respectively, which extend through the base member so as to be exposed at the upper side 26 thereof. The coils are secured to the base 15 by spreading the pole ends, as indicated at 51 in Fig. 3, to hold them in position in the base 15. As best shown in Fig. 2, the poles are arranged in spaced relation in a circle concentric with the ring or armature track 24, with each pair of poles being positioned substantially centrally of one of the segments next adjacent to its corresponding segment. In other words, the segment corresponding to a pair of poles is positioned in advance of such pair of poles in a direction depending upon the direction of the wobble movement of the armature 37. This arrangement provides for the magnetic energization of the poles as the armature is being tipped toward them. Thus as shown in Figs. 2 and 4, the segments 23*a*—23*c*, in that order extend in a clockwise direction. However, the coil 48*a* and hence poles 49*a* corresponding to the segment 23*a*, are located opposite the segment 23*b*, and similarly coils 48*b* and 48*c*, are located opposite the segments 23*c* and 23*a*, respectively; the corresponding coils and segments being electrically connected through conductors 51*a*—51*c*, respectively.

The magnet coils are illustrated as being connected in parallel, with electrical energy being supplied from a source such as a battery 52, although it is to be understood that the coils may also be operated on alternating current. A successive closing of the energizing circuits for each coil 48*a*—48*c*, is obtained by the switch arm or control disc 43 (Figs. 1 and 4), previously noted, which is mounted on the armature shaft 36 in substantial parallel alignment with the armature 37. The disc 43 is arranged between the armature and ball connection 29—34, for engagement of its circumferential portion with the segments 23*a*—23*c*. The disc 43 is in electrical connection with the battery 52 through a conductor 54 and is normally maintained under tension by a disc spring 56, also positioned about the shaft 36; the contact disc 43 and spring 56 being movable with the armature 37. Thus any tipping of the armature effects a similar tipping of the disc 43, to provide for the contact of a part of the circumferential portion of the disc with one of the segments 23*a*—23*c*. The armature 37, as was before noted, is maintained in a slightly tipped position at all times by the toggle action of the spring 39; the amount of the tipping being sufficient to assure the contact of the disc 43 with a segment when the motor is shut down. The disc 43, therefore, will always be in contact with one of the segments 23*a*—23*c*, so that one of the coils 48*a*—48*c* will be energized immediately upon closing of the motor control switch 57. It is to be understood, however, that the action of the spring does not tilt the armature into engagement with the ring 24, so that the armature and ring are always separated when the motor is not operating.

Referring to Figs. 2 and 4, assume the disc 43 to be in contact with the commutator segment 23*a* on closing of the control switch 57, this contact position, since the disc is movable with the armature, representing also the slightly tipped position of the armature 37. Current from the battery 52 will thus flow through the disc 53, segment 23*a*, and conductor 51*a* to energize the coil 48*a* to provide for the magnetization of the pair of poles 48*a*. The poles 49*a* magnetically attract the armature 37 into engagement with the track 24 and tip the armature in a clockwise direction, as viewed in Fig. 2. This tipping action of the armature also similarly tips the disc 43, since the commutator disc and armature are movable together, to progressively change its contacting position with the segment 23a. As the disc 43 is moved out of engagement with the segment 23a and into engagement with the segment 23b the coil 48a will be de-energized so that the poles 49a will no longer magnetically attract the armature 37. However, the moving of the disc 43 from the segment 23a to the segment 23b closes the energizing circuit for the coil 48b to magnetize the poles 49b so that the armature 37 is magnetically attracted by these poles, whereby its wobble movement or tipping action in a clockwise direction is continued. This successive attraction of the armature 37 by the successive magnetization of the poles 49a—49c, provides for a substantially continuous tipping or wobble action of the armature 37 so long as the control switch 57 remains closed; the direction and speed of rotation of the armature 37 and hence of the motor shaft 27 being dependent upon the relative lengths or geared arrangement between the armature portion 38 and contact ring 24, as was previously fully described. It is contemplated that the annular portion of the armature 37 positioned immediately above the magnet poles 49a—49c, be formed with a slight taper so as to preclude the possibility of any flush engagement and consequent freezing of the armature to any of the poles.

A reversed operation or rotation of the shaft 27, apart from a change in the physical design and structure of the armature and contact ring as by a difference in the lengths of their engageable portions, or in the number of teeth on each, may be obtained by a changing of the connections for the conductors 51a—51c, so that the engagement of the commutator segments by the control switch arm 43, successively energizes the magnet coils in a reversed direction. This is accomplished by the reversing switch 58 shown in Fig. 4. For the clockwise direction of the armature wobble movement just described switch arms 58a—58c are in closed position in the conductors 51a—51c, respectively, as shown in full lines; the conductors at the switch 58 being arranged in that order reading from right to left. The switch 58 also includes an open terminal 59 which is connected by a conductor 60 to the conductor 51c near the segment 23c. Moving of the switch arms 58a—58c to the right, as viewed in Fig. 4, to the position shown in dotted lines, connects the segment 23a with coil 48b, segment 23b with coil 48c and segment 23c with coil 48a, the latter connection being effected through the conductor 60 and previously opened terminal 59. Assuming the disc 43 to again be in contact with the segment 23a and the control switch 57 in closed position, the coil 48b will be energized to magnetize the poles 49b. The poles 49b, therefore, will magnetically attract the armature 37 into engagement with the contact ring 24 and the armature will be pulled in a counter-clockwise direction. As the armature 37 continues to roll in this direction the disc 43 will become disengaged from the segment 23a and will engage segment 23c. Poles 49b will thus be demagnetized and the circuit of the magnet coil 48a will be energized to magnetize the poles 49a, this magnetization occurring in advance of the rolling movement of the armature 37 to continue the magnetic pull thereon in the counter-clockwise direction. This successive attraction of the armature in a counter-clockwise direction will continue so long as the switch 57 remains closed. A reversal in the direction of the armature travel is thus obtained by operation of the switch 58 to provide for a reversed rotation of the motor shaft 27 regardless of the relative dimensions of the armature and contact ring. Since the poles 49a—49c are arranged substantially centrally of the ends of the commutator segments, the magnetic attraction by the poles on the armature 37 is equally strong for either direction of travel or movement of the armature.

As previously mentioned, the spring 39 in the embodiment of Figs. 1 and 5 functions to slightly tip the armature an amount sufficient to maintain a positive contact at all times between the disc 43 and one of the commutator segments 23a—23c, so that one of the magnet coils will be energized immediately upon closing of the motor switch 57. However, engagement of the armature 37 with the contact ring 24 does not occur until after one of the coils has become energized and the armature is pulled into engagement with the ring by magnetic attraction. So long, therefore, as the motor switch 57 remains closed the armature will be held in engagement with the ring 24. Immediately on opening of the switch 57 the armature is pushed out of engagement with the ring 24 by the resilient action of the disc 43 and spring 56. Thus when the motor is shut down the armature is automatically released from the speed reduction or gear reducing member 24 and is freely and easily rotatable with the shaft 27. Clutch means for disengaging the motor from its load in the event manual operation of the load is desired are entirely eliminated since the motor is completely free in its rotation. This "free wheeling" feature of the motor is particularly useful in conjunction with radio tuning apparatus although its use is not to be so limited. Also on shutting down of the motor the continued engagement of the disc 43 with the commutator segments acts as a frictional brake on the armature. Since the armature structure is relatively light, this braking action is sufficient to substantially completely eliminate any overrunning of the motor on stopping thereof.

Figure 8:
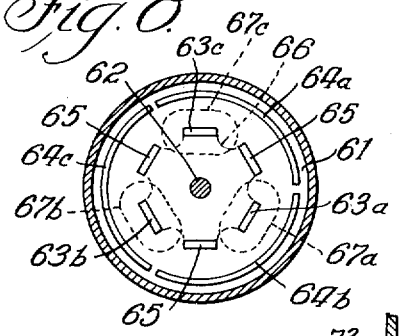
Fig. 8 is a plan view taken approximately along the line 8—8 of Fig. 7.
Figure 7:
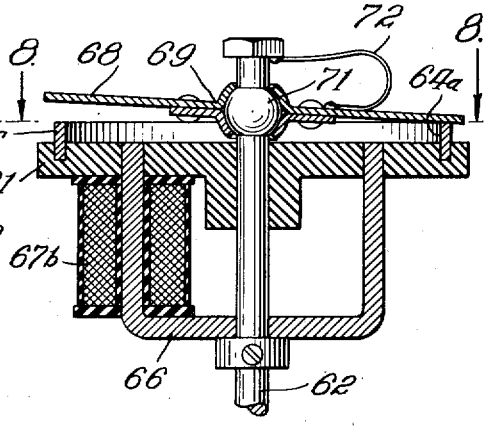
Fig. 7 is a sectional view of a modified form of the invention.

The modification in Figs. 7 and 8 illustrates the invention as applied to a small electric motor having a diameter on the order of about 1 inch. This motor is adapted for uni-directional rotation only and includes a base member 61, of substantially flat circular shape, the motor shaft 62 being rotatably supported substantially centrally of the base member and the poles 65 and 63a—63c and commutator segments 64a—64c being concentrically arranged about the motor shaft. All of the poles are integrally formed as parts of a magnetic yoke 66, the magnet coils 67a—67c being mounted about alternate poles 63a—63c, respectively. The coils are assembled on the base member 61 by the extension of the poles through the base member, the pole ends being suitably spread or peened to hold the coils and poles in their assembled positions. The armature 68 is formed at its center with a socket portion 69 for engagement with a ball 71 provided near the upper end of the shaft 62. The armature is thus freely rockable in all directions for direct frictional engagement with the commutator segments 64a—64c which are slightly raised from the base member 61 and serve as a track means or contact ring for the armature. Tipping of the armature into engagement with a segment provides for an energization of the magnet coil corresponding to such segment, the armature per se being included in the coil circuits. Engagement between the armature 68 and a segment 64a—64c at all times is assured by the action of a spring 72 which is secured at one end near the top of the shaft 62 and at its opposite end to the armature 68, the spring functioning also as a driving connection between the armature 68 and the shaft 62.

In uni-directional motors it has been found that a more positive and continuous wobble or rocking movement of the armature is obtained with the poles arranged to magnetically attract the armature substantially immediately after their magnetization. When the motor is of rather small diameter the poles are spaced relatively close together as is clearly seen in Fig. 8, so that an equal magnetization of all of the poles would set up opposed magnetic attractions on the armature during its movement from one segment to the next adjacent segment. The magnetically effective poles, therefore, are positioned at the segment end which is first engaged by the armature during its rocking movement. Because of the structural arrangement of the poles, the poles 63a—63c which extend through the coils 67a—67c, respectively, are more strongly magnetized than the poles 65 positioned therebetween, and as shown in Fig. 8 are arranged to rotate the armature 68 in a clockwise direction. The poles 65 adjacent the coils have their magnetic intensity further reduced by an increased air gap between such poles and the armature as compared to the gap between the poles 63a—63c, extending through the coils, and the armature.

In the operation of this modification assume the armature 68 to be tipped by the spring 72 in a direction to engage the segment 64a. On closing of the motor circuit the coil 67a will be energized to strongly magnetize the pole 63a. The magnetic attraction of the pole 63a on the armature will pull the armature in a clockwise direction, as viewed in Fig. 8, which movement will carry the armature into engagement with the segment 64b so as to energize the next succeeding coil 64b to provide for the magnetization of the pole 63b. Attraction of the armature to the pole 63b will continue the clockwise movement of the armature, the successive energization of the coils 67a—67c, in this manner, providing for a substantially continuous clockwise movement of the armature so long as the motor circuit remains closed. On opening of the motor circuit the armature 68 remains in engagement with one of the segments 64a—64c to provide for the energization of a magnet coil immediately upon a reclosing of the motor circuit; the armature per se functioning to selectively control the energization of the magnet coils.

Figure 10:
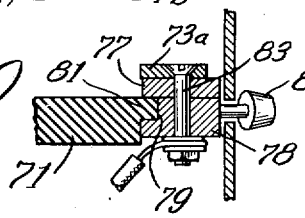
Fig. 10 is an enlarged sectional view as seen along the line 10—10 of Fig. 9.
Figure 9:
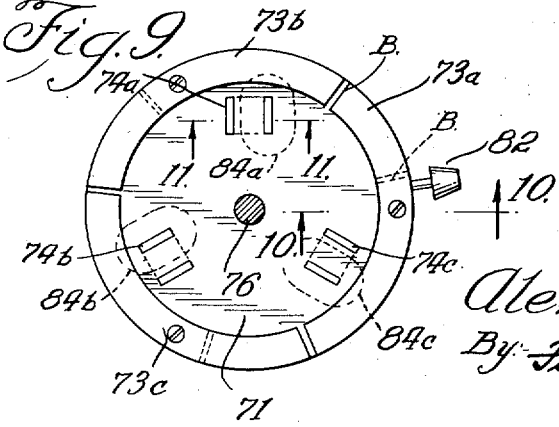
Fig. 9 illustrates a modified form of the embodiment shown in Figs. 7 and 8.

The motor illustrated in Figs. 9 and 10 is somewhat similar to the structure of Figs. 7 and 8 and includes a base member 71, commutator segments 73a—73c having corresponding poles 74a—74c, respectively, and a motor shaft 76. The poles and segments are concentrically arranged about the saft, with the segments adapted for direct engagement with an armature (not shown) which may be similar to the armature 68 previously described in connection with Fig. 7. The segments 73a—73c are supported on an insulating ring 77 which is in mating engagement with a ring 78, the rings 77 and 78 forming an annular recess 79 for slidable engagement with an annular shoulder portion 81 formed on the base member 71. Relative angular displacement of the segments 73a—73c and the fixed poles 74a—74c is obtained by sliding the rings 77 and 78 about the base member 71, this sliding movement being facilitated by an adjusting knob 82 which is suitably secured to the ring 78 at the periphery thereof. An adjusted position of the segments relative to the poles is maintained by adjustment of the clamping screws 83 which act to bind the rings 77 and 78 on the base shoulder portion 81. As shown in full lines in Fig. 9 the poles 74a—74c are arranged at the segment ends first approached when taking the segments in that order in a clockwise direction. Since, as was previously described, the poles corresponding to a commutator segment are angularly displaced from that segment in the direction of rocking movement of the armature the full line showing of the segments 73a—73c, indicates a counterclockwise movement of the armature. A reversed directional movement of the armature, that is, movement in a clockwise direction, is obtained by loosening the clamping screws 83 and moving the commutator segment assembly relative to the base 71 and hence the poles, an amount indicated by the lines B—B for the segment 73a. The poles are thus positioned at the opposite ends of the segments. It is to be understood, of course, that the electrical connections between the poles and segments must also be changed, in a manner such as was fully described in Fig. 4 with respect to the switch 58, to provide for the successive magnetization of the poles 74a—74c in a reverse direction. Engagement, therefore, between the armature (not shown) and say segment 73a in its dotted line position, will thus effect a magnetization of the poles 74b, with segments 73c and 73b controlling the magnetization of the poles 74a and 74c, respectively. The segments are thus adjustably positioned relative to the poles in a manner to provide for the most efficient operation of the motor for both directions of rotation.

Figure 12:
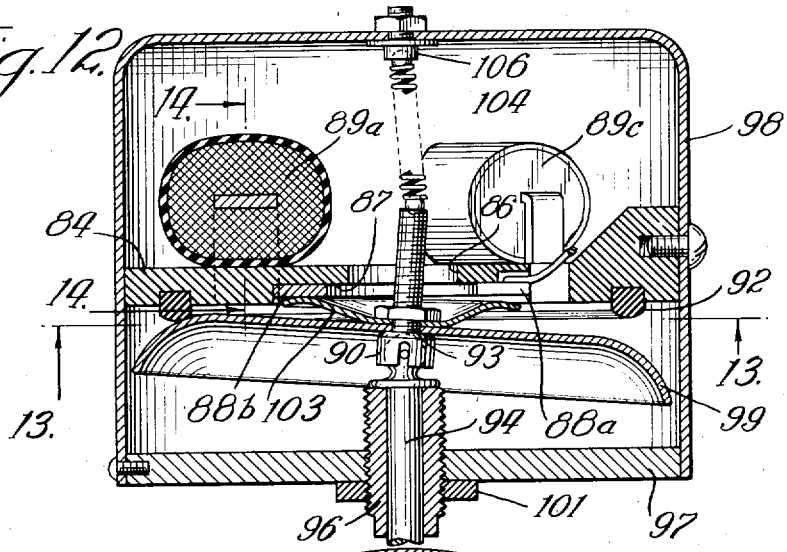
Fig. 12 is a sectional view of another modification of the invention.
Figure 13:
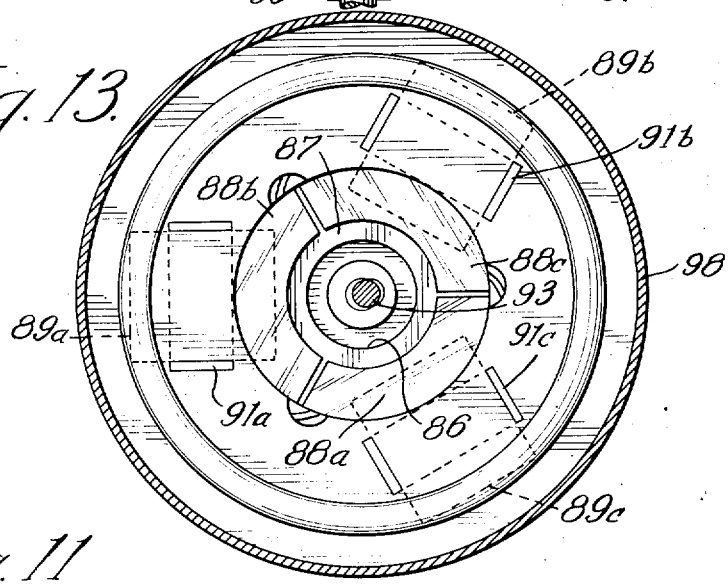
Fig. 13 is a view taken approximately along the line 13—13 in Fig. 12.

A further modified form of the invention is shown in Figs. 12 and 13. The fixed base portion 84 is of substantially flat shape and is provided with a bore 86 at the central portion thereof. An annular recess 87 is provided at the lower end of the bore 86, as viewed in Fig. 12, for the receution of commutator segments 88a—88c. Magnet coils 89a—89c are concentrically arranged about the segments; the coils being assembled similarly to the coils in Figs. 1 and 5 and having corresponding poles 91a—91c, respectively. The contact ring or armature track 92 is provided in a suitable friction material such as rubber, leather or the like; with its engaging surface being of substantially semi-spherical shape. The armature shaft 93 is connected by a ball and socket joint 90 to the motor shaft 94 which is rotatably supported on and in a bushing 96, threadably secured in a supporting member or brace 97. Since the member 97 is attached to the housing 98, which in turn is attached to the fixed base portion 84, vertical adjustment of the bushing 96 as viewed in Fig. 12, vertically displaces the shafts 93 and 94 so as to change or shift the portion of the armature 99 which is engageable with the ring 92, as will be explained. Adjustment of the bushing is obtained in an obvious manner by concurrent manipulation of the bushing 96 and the lock nut 101.

The armature 99 is mounted on the armature shaft 93 with a spring switch 103 of disc form; the switch being arranged for engagement with the segments 88a—88c and movable with the armature 99. A spring 104 arranged in compression between the support 105 on the housing 98 and the shaft 93 acts to tip the armature sufficiently to hold the disc switch in contact with the segments at all times, as previously explained in connection with the spring 39 and switch 43 of Figs. 1 and 5. The armature 99 near its circumferential portion is of arcuate contour, such portion being adapted for engagement with the ring 92. This structure of the armature provides for an armature of greater diameter than the contact ring 92 being pivotally movable relative to the ring so as to vary the gear reduction or speed of the motor. Thus on movement of the shaft 94 away from the base portion 84 the axis of the armature shaft 93 is permitted to increase its angular inclination relative to the axis of the motor shaft 94; the extent of angular inclination being limited by the engagement of the armature with the contact ring. Since the arcuate shape of the armature follows somewhat the arc described by the pivotal movement of the armature a greater angular inclination or pivotal movement of the shaft 93 is obtained on vertical adjustment of the bushing 96 than could be obtained if the armature 99 were of flat form. That is, the arcuate form of the armature, for a relatively small adjustment of the shaft 94, permits the armature to pivot through a substantially large act so that an appreciable change occurs between the annular or circumferential lengths of successive armature portions engageable with the contact ring 92. With the circumferential length of the track 92 remaining the same the variation in the length of the armature portions engageable with the track varies the speed of the motor in a manner which was previously fully described in connection with Figs. 1 and 5.

Thus with reference to Fig. 13 assume the armature rocking or wobble movement to be in a clockwise direction, the control circuit for the motor being the one illustrated in Fig. 4, herein above fully described. With the shaft 94 near its upper adjustable limit, that is moved near the base 84, the length of the armature portion in engagement with the ring 92 is but slightly greater than the circumferential length of the ring. On completion of an armature wobble cycle, therefore, but a relatively small angular displacement in a clockwise direction will occur between the armature and the ring. The motor is thus conditioned for operation at its slowest speed. As the shaft 94 is progressively moved away from the base 84 the circumferential length of the armature in engagement with the ring 92 is progressively increased whereby to correspondingly increase the angular displacement per wobble cycle between the armature and the contact ring. The speed of the motor is thus also progressively increased; the limit of such increase being defined by the structural limits of the armature and contact ring. The motor speed is thus readily varied by vertical adjustment of the shaft 94. The rotation of the motor is reversed by operation of the switch 58 (Fig. 4); the motor speed in the reversed direction being similarly controlled by adjustment of the bushing 96.

The arcuate contour of the armature positions the armature, during normal operation of the motor, above the poles 91a—91c a distance somewhat less than the height of the ring 92. To eliminate any "freezing" of the armature with the poles it is contemplated that the poles be sunk slightly below the surface of the portion 84. There is thus provided a motor for high torque application which is readily adjusted to a plurality of speeds by external adjustment of a single adjusting member. It is to be understood that the motor is "free wheeling" on stopping thereof in the manner hereinabove fully described in connection with Figs. 1 and 5.

Figure 11:
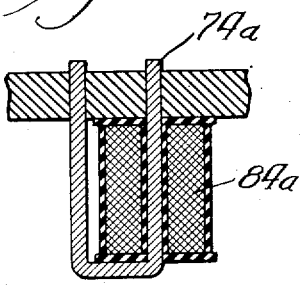
Fig. 11 is an enlarged sectional view taken along the line 11—11 in Fig. 9.
Figure 14:
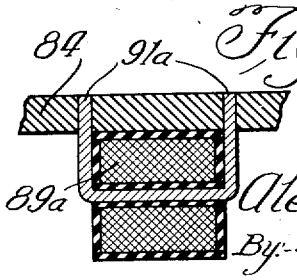
Fig. 14 is a detail view of an electro-magnetic unit as seen along the line 14—14 of Fig. 12.

Referring to Figs. 11 and 14 the magnet coils 84a and 89a, respectively, are illustrated with their poles 74a and 91a at opposite ends of a U-shape or horseshoe core, the cores on energization of the coils functioning as a horseshoe magnet. The structure of Fig. 14 is shown in connection with the embodiment of Figs. 12 and 13, the coil structure of which is similar to that of Figs. 1 and 5, while the structure of Fig. 11 is shown in the embodiment of Fig. 9. These structures, however, may be interchangeably used depending upon the desired operating conditions to be obtained. Thus it has been found that an increased space between the poles 91a, as shown in Fig. 14, provides for a stronger magnetic attraction thereto of the armature disc, since the disc in passing thereover will function as a return path for the magnetic lines of force at the poles. In the coil and pole assembly of Fig. 11 it may happen, depending upon the assembly arrangement of the armature, that the lines of force will jump from one pole 74a to the other without passing through the armature disc, whereby to substantially reduce the magnetic attraction of the disc to the poles. It is to be understood, however, that the invention is not limited to the use of these coil and pole assemblies, and that any magnet assembly may be used which provides for a sufficient magnetic intensity to effect a continued rocking or wobble movement of the armature.

It is seen, therefore, that the invention provides for an electric motor of novel type which is comprised of but few parts adapted for assembly in a manner to make it commercially available at very low cost. The assembly of the armature to be continuously wobbled or rocked while maintained in driving engagement with the motor shaft and guiding ring or track, provides for a variable speed motor by virtue of the motor structure, whereby to eliminate any rheostats in the motor circuit or gear reduction means in the power transmitting system. The continuous engagement of the disc control switch with the commutator segments establishes a small friction at all times opposing the movement of the armature, so that when the motor is shut off the armature is automatically braked to prevent its continued movement after the shutdown. This advantage is further benefited by the provision of a light armature of disc form which structure appreciably reduces the inertia effects of the armature both on starting and stopping of the motor. When the motor is shut down the armature is automatically released from its engagement with the contact ring or track so as to be entirely free for direct movement with the motor shaft. This "free wheeling" action of the motor facilitates the direct connection of the motor in driving relation with controllable apparatus adapted for both automatic and manual control, and completely eliminates the necessity for any clutch means or the like, for disconnecting the motor from the apparatus during times of manual control.

Although the invention has been described specifically with reference to the rotating of the armature for rotating a motor shaft, it is to be understood that it may be operated for use independently of the motor shaft. The wobble or rocking movement alone of the armature may be utilized entirely as a cam action or for any purpose where a wobble plate is applicable. It is to be understood further that only preferred embodiments of the invention have been illustrated and described and that modifications and alterations thereof can be made which are within the full scope of the invention as defined by the appended claims.

I claim:

1. An electric motor comprising a motor shaft, and a fixed portion with a base having electromagnetic units mounted thereon, each of said units having poles extending through said base, said poles being substantially circularly arranged in a spaced relation on said fixed portion, an armature on said shaft rockably movable into the effective magnetic zone of said poles, a circuit for each of said units, means for successively closing said circuits to correspondingly energize said units and provide for a substantially continuous rockable movement of said armature, and means for effecting an angular displacement of said armature during its rocking movement to rotate said shaft, with said latter means retaining said armature spaced laterally of said pole faces.

2. An electric motor including a motor shaft and a fixed portion, magnet coils attached to said portion and having poles exposed from one side of said portion and radially disposed from a point thereon, an energizing circuit for each coil including a commutator segment, an armature on said shaft laterally disposed from said poles, said armature being rotatable with said shaft but pivotally movable in all directions into the magnetic field of said poles and magnetically attractable thereby, means cooperating with said segments to successively operate said circuits in a predetermined manner to provide for a progressive pivotal movement of said armature in a predetermined direction, and means for rotating said armature during said pivotal movement to rotate said shaft.

3. An electric motor including a fixed position and a movable portion, said fixed portion having a plurality of electro-magnetic units thereon, each of said units including pole means with one end thereof substantially exposed with reference to said fixed portion, and which said substantially exposed portions of said pole means being radially disposed from the center of said fixed portion and substantially uniformly spaced relative to one another around said fixed portion, said movable portion including a shaft journaled in said fixed portion, an armature on said shaft, means for mounting said armature on said shaft so that such armature is rockably movable but not rotatable relative to said shaft and into the effective magnetic zone of said pole means, and cooperating means on said armature and on said fixed portion for successively energizing the electro-magnetic units to attract said armature to said pole means successively around said fixed portion and to accomplish a rotary as well as a rocking movement of said armature relative to said fixed portion to rotate said shaft, said cooperating means including a circular pathway concentric with said pole means and adapted to retain said armature laterally spaced from the exposed ends of said pole means.

4. Electrical apparatus including a fixed portion having magnetic means thereon radially disposed from a point thereon and arranged in a substantially uniform spaced relation, circular track means concentric with said magnetic means, an armature laterally disposed from said magnetic means, and magnetically attractable thereby having its axis at said point and its circumferential portion engageable with said track means, with said track means supporting said armature in a spaced relation laterally of said magnet means, said armature being pivotally movable into the magnetic field of said magnetic means, an energizing circuit for said magnetic means, means for selectively controlling said energizing circuit to operate said magnetic means in a predetermined manner, and means for supporting said armature so that the attraction of said armature by said magnetic means effects a progressive engagement of said circumferential portion with said track means to provide for a continuous wobble movement of said armature.

5. Electrical apparatus comprising a fixed member having a plurality of magnet coils mounted thereon, each of said coils having poles exposed on one side of said member and radially disposed from a point thereon, circular track means arranged about said poles, an energizing circuit for each of said magnet coils including a conductor segment, said segments being in concentric arrangement with said track means, an armature positioned in the effective magnetic zone of said poles and having its axis at said point, means for supporting said armature to provide for the progressive tipping of its circumferential portion into engagement with said track means, and means movable with said armature for successively engaging said segments to successively close said circuits to correspondingly energize said coils, said armature being magnetically attractable by said poles to provide for a rolling of said circumferential portion on said track means.

6. An electric motor including a fixed member and a motor shaft rotatably supported in said member, a plurality of magnet coils mounted on said member, said magnet coils having poles exposed on one side of said member and radially disposed about said shaft, an armature ring, an energizing circuit for each of said coils including a commutator segment, said armature ring and segments being concentrically arranged about said shaft, an armature in driving engagement with said shaft and pivotally supported thereon for a rockable movement in all directions, said armature being positioned in the effective magnetic zone of said poles with a circumferential portion thereof engageable with said armature ring, and switch means movable with said armature to engage said commutator segments to successively close the energizing circuits for said magnet coils, the magnetic attraction on said armature by the poles progressively moving said circumferential portion into engagement with said armature ring to provide for a rocking and rotary movement of said armature to rotate said shaft.

7. An electric motor comprising a fixed member and a motor shaft rotatably supported in said member, a plurality of magnet coils mounted on said member, said coils having poles exposed on one side of said member and radially disposed from a point thereon, an energizing circuit for each of said coils including a commutator segment, an armature on said shaft laterally disposed from said poles and magnetically attractable thereby, means for supporting said armature for rotatable movement with said shaft but rocking movement independently of said shaft, means engageable with a circumferential portion of said armature for limiting the degree of rocking movement thereof, and a control switch movable with said armature for engaging said segments to selectively energize said coils to magnetize said poles in rotative succession, the attraction of said armature by said poles progressively engaging said circumferential portion with said limiting means to provide for a substantially continuous wobble movement and rotation of said armature to rotate said shaft.

8. An electric motor comprising an insulating frame member and a motor shaft rotatably supported in said member, said member having a plurality of magnet coils positioned thereon, said coils having poles exposed on one side of said member and arranged in a circle about said shaft, an energizing circuit for each of said coils including a commutator segment, said segments being concentrically arranged relative to said poles, an armature on said shaft, and means for mounting said armature on said shaft so that such armature is rockably movable but not rotatable relative to said shaft, said armature being magnetically attractable by said poles and having a circumferentially extending working face, a contact ring concentrically arranged about said circle of poles and engageable with said working face, said armature being normally inclined relative to said contact ring so that only a portion of said face engages said contact ring, and a control switch movable with said armature and arranged to selectively engage said segments to energize said coils to provide for a successive magnetization of said poles, the magnetization of said poles occurring in advance of the portion of said working face in engagement with said contact ring to effect a substantially continuous wobble movement of said armature on said contact ring, said ring and working face being of unequal lengths to provide for a predetermined angular displacement of the armature during said wobble movement to rotate said shaft.

9. An electric motor including insulating frame means and a motor shaft rotatably supported in said frame means, a plurality of magnet coils on said frame means, each of said coils having poles exposed from one side of said frame means and circularly arranged about said shaft, an energizing circuit for each of said coils including adjustable commutator segments concentrically arranged relative to said poles, said segments being engageable with the circumferential portion of said armature with the segment corresponding to a pole being located opposite one of the next adjacent poles, an armature on said shaft supported so as to be rotatable with but pivotally movable independently of said shaft, said armature being magnetically attractable by said poles and common to said energizing circuits, with movement of said armature on said segments acting to selectively close said energizing circuits, engagement with a segment serving to magnetize the pole immediately in advance of the armature movement to effect a substantially continuous wobble movement of said armature, each of said poles being located relative to the segment opposite therefrom near the end first contacted by said armature during its wobble movement, so as to be in close proximity to said armature immediately on being energized, with the combined lengths of said segments being of a different length than the circumferential portion of said armature to rotate said armature during said wobble movement to rotate said shaft, means for mechanically adjusting said segments relative to said poles, and means for electrically adjusting said segments relative to said coils to provide for a reversed wobble movement of said armature to rotate said shaft in a reversed direction.

10. An electric motor including a motor shaft and frame means, a plurality of magnet coils mounted on said frame means, each of said coils having a pole exposed from one side of said frame means, said poles being angularly spaced in a substantially circular arrangement about said shaft, an energizing circuit for each of said coils including commutator segments concentrically arranged relative to said poles, with the segment corresponding to a pole being located opposite one of the next adjacent poles, an armature on said shaft common to said energizing circuits, means for supporting said armature on said shaft so that such armature is rockably movable but not rotatable relative to said shaft, said armature being normally inclined for engagement with said segments and magnetically attractable by said poles, successive engagement of said segments by said armature acting to close said energizing circuits to successively magnetize the poles to provide for a substantially continuous wobble movement of said armature, each of said poles being located relative to the segment opposite therefrom near the segment end first contacted by said armature during such wobble movement so as to exert a maximum magnetic pull on the armature in the direction of wobble movement immediately on being energized.

11. An electric motor including a fixed portion and a movable portion, said fixed portion having a plurality of electro-magnetic units thereon, each of said units including pole means with one end thereof substantially exposed with reference to said fixed portion, and with said substantially exposed portions of said pole means being radially disposed from the center of said fixed portion and substantially uniformly spaced relative to one another around said fixed portion, said movable portion including a shaft journaled in said fixed portion, an armature on said shaft, means supporting said armature for rotation with said shaft but permitting tilting movement thereof in all directions relative to said shaft and into the magnetic field of said poles for magnetic attraction thereby, means yieldably urging said armature into a tilted position so that a portion thereof is positioned within said magnetic field, and cooperating means on said armature and on said fixed portion for successively energizing the electro-magnetic units to attract said armature to said pole means successively around said fixed portion and to accomplish a rotary as well as a uni-directional rocking movement of said armature relative to said fixed portion to rotate said shaft.

12. In an electro-magnetic motor including a motor shaft and a fixed member having a plurality of magnets circularly arranged thereon, an armature on said shaft, means for mounting said armature for rotation with said shaft but for a wobble movement independently of said shaft, said armature being laterally disposed from said magnets and magnetically attractable thereby, a contact ring having a succession of teeth formed thereon, concentrically arranged relative to said magnets, said armature having a circumferential face portion formed with teeth engageable with the teeth on said contact ring, with the number of teeth on said face portion and contact ring being unequal, and means for successively operating said magnets to successively attract said armature to provide for a continuous wobble movement thereof, the progressive engagement of said face portion and contact ring effecting a rotation of the armature during said wobble movement to rotate said shaft, with the direction and speed of said shaft rotation being determined by the difference in the number of teeth on said face portion and contact ring.

13. Electrical apparatus including a fixed portion and a movable portion, said fixed portion having a plurality of electro-magnetic units thereon, each of said units including pole means with one end thereof substantially exposed with reference to said fixed portion and with said substantially exposed portions of said pole means being radially disposed from the center of said fixed portion and substantially uniformly spaced relative to one another around said fixed portion, said movable portion including a shaft journalled in said fixed portion, an armature, axis means for said armature, means operatively connecting said axis means with said shaft for rotation concurrently therewith, but permitting pivotal movement of said axis means in all directions out of axial alignment with said shaft to provide for the rocking of said armature into the magnetic field of said pole means for magnetic attraction thereby, means yieldably urging said axis means to a position out of axial alignment with said shaft to retain the armature in said magnetic field, and cooperating means on said armature and said fixed portion for successively energizing the electro-magnetic units to attract said armature to said pole means successively around said fixed portion and to accomplish a rotary as well as a unidirectional rocking movement of said armature relative to said fixed portion to rotate said shaft.

14. An electric motor including a motor shaft and a fixed portion, magnet coils attached to said portion and having poles exposed from one side of said portion and radially disposed from a point thereon, an energizing circuit for each of said coils, an armature on said shaft rotatable therewith but pivotally movable in all directions into the magnetic field of said poles for magnetic attraction thereby, cooperating means on said armature and fixed portion for successively operating said circuits and energizing the coils to attract said armature to said poles successively around said fixed portion and to accomplish a rotary as well as a unidirectional pivotal movement of said armature relative to said fixed portion to rotate said shaft, said cooperating means being adapted to support said armature in a spaced relation laterally of said exposed poles, and means retaining said armature in said magnetic field to normally close one of said coil circuits through said cooperating means.

15. In electric motor means including a shaft and magnet means having pole face ends; the means for driving said shaft including in combination a unit portion operatively connected with said shaft and having a plurality of annularly arranged teeth thereon, another portion having substantially correspondingly arranged teeth thereon, with the teeth on one of said portions varying in number relative to the other to provide a gear reduction for the shaft, and means for mounting said unit portion centrally thereof and in a manner and position such that said unit portion at one part tips toward the pole face ends of said magnet means into the effective zone of the magnet means to provide engagement between at least one tooth thereof and a corresponding tooth on said another portion, said unit portion being spaced from the pole face ends of said magnet means in any tipped position thereof.

16. In electric motor means having a shaft and a plurality of driving magnets provided with pole-face ends and including windings adapted to receive commutated current pulses; the means for driving said shaft including in combination a movable unit spaced from the pole face ends of said magnets and having a substantially annular toothed portion, and another portion having a substantially annular toothed portion, with one of said portions having a different number of teeth therein than the other portion to provide a gear ratio therebetween, and means for mounting said unit in a manner such that it tips in successive annularly arranged parts toward successively energized driving magnets and spring means for maintaining relative meshing engagement between at least one tooth of each toothed portion.

17. Electric motor means comprising magnet means having pole face ends, means for controlling said magnet means to produce a magnetic field which travels around a closed orbit, toothed rotor means including a magnetic portion disposed in said field away from said pole face ends, means supporting said rotor means so that the traveling magnetic field tilts successive portions of said rotor means, and means coacting with the teeth of said rotor means to convert the tilting movement of said rotor means into rotary movement thereof.

18. In electric motor means having a shaft and a plurality of successively energizable magnets with pole faces in a substantially annular pathway and having an engaging pathway radially spaced from said substantially annular pathway; the means for rotating said shaft including in combination a movable unit having a magnetic portion spaced from said pole faces and adapted to be attracted by successively energized pole faces, and an engaging portion corresponding to said engaging pathway for engagement therewith on said successive energizations to advance the unit, and means including a commutator device moved synchronously with said movable unit for successively energizing said magnets.

19. In electric motor means having a shaft and magnet means; the combination of means for driving said shaft including a tippable rotor having a substantially annular drive portion thereon, means having a corresponding substantially annular portion for progressive engagement with successive parts of said drive portion, circuit means contacts for the magnet means, and commutator means independent of said rotor but acting in synchronism therewith for successive engagement with the circuit means contacts to successively close the circuits therethrough to the magnet means to attract and tip the rotor and provide movement thereof.

20. In a motor having a shaft and a plurality of magnets having pole faces in a substantially annular pattern; the means for driving said shaft including in combination a tippable rotor adapted to be attracted in successive substantially annularly arranged portions toward successive pole faces, means centrally of said unit for mounting the same, and commutator means generally centered relative to the center of said rotor having a yielding contact portion rotatable simultaneously with said rotor and having another portion with insulated segments, said yieldable contact portion being tippable into engagement with a corresponding segment.

21. In an electric motor having a shaft and a plurality of electro-magnetic units and circuits with poles arranged in a substantially circular path; the means for driving said shaft including in combination a unit with an armature portion rockably movable into the effective zone of successive poles, means for successively closing the circuits through the electro-magnetic units, means for connecting the unit and shaft to permit tipping of the armature portion for rocking movement thereof, and spring means acting upon said armature portion to apply an off-center force thereto, thereby to maintain said armature portion generally in a tipped position relative to the shaft.

22. In an electric motor having a shaft and magnet means having poles; the means for driving said shaft including in combination an armature rockably movable into the effective zone of successive poles, means for connecting the armature and shaft to permit tipping of the armature relative to the shaft for rocking movement of the armature, and spring means acting on said armature in a manner to apply an off-center force thereto to maintain it generally in a tipped position but permit rocking movement thereof.

ALEXANDER W. PLENSLER.